United States Patent [19]

Rose

[11] 3,997,143
[45] Dec. 14, 1976

[54] VEHICLE IN-PLACE ELECTRIC JACK
[76] Inventor: Frank P. Rose, 328 San Domingo Drive, Palm Springs, Calif. 92262
[22] Filed: Sept. 2, 1975
[21] Appl. No.: 609,368
[52] U.S. Cl. .............................. 254/86 R; 254/122
[51] Int. Cl.² ......................................... B66F 3/22
[58] Field of Search ................ 254/86 R, 122, 126

[56] References Cited
UNITED STATES PATENTS

| | | | |
|---|---|---|---|
| 1,393,851 | 10/1921 | Thorndike | 254/86 R |
| 1,714,464 | 5/1929 | Merriman | 254/126 |
| 1,918,783 | 7/1933 | Redding | 254/86 R |
| 1,920,216 | 8/1933 | Ramondette | 254/126 |
| 2,218,733 | 10/1940 | Watts | 254/86 R |
| 2,593,024 | 4/1952 | Hall et al. | 254/86 R |
| 2,747,836 | 5/1956 | Sherman | 254/86 R |
| 3,347,523 | 10/1967 | Hankey et al. | 254/122 |
| 3,451,655 | 6/1969 | Scott | 254/122 |

*Primary Examiner*—Al Lawrence Smith
*Assistant Examiner*—Robert C. Watson
*Attorney, Agent, or Firm*—Whann & McManigal

[57] ABSTRACT

In-place vehicle jack assemblies of the pivoted lever type to be permanently mounted at the front and rear of the vehicle frame structure, each of the jack assemblies comprising a unitary device which is independently operable by an electric motor, and independently selectively controlled at the jack or remotely from the control compartment of the vehicle, control circuits for the jack assemblies being interlocked with the ignition system of the engine, so that the jacks are operable only when the ignition switch is in an "off" position.

7 Claims, 7 Drawing Figures

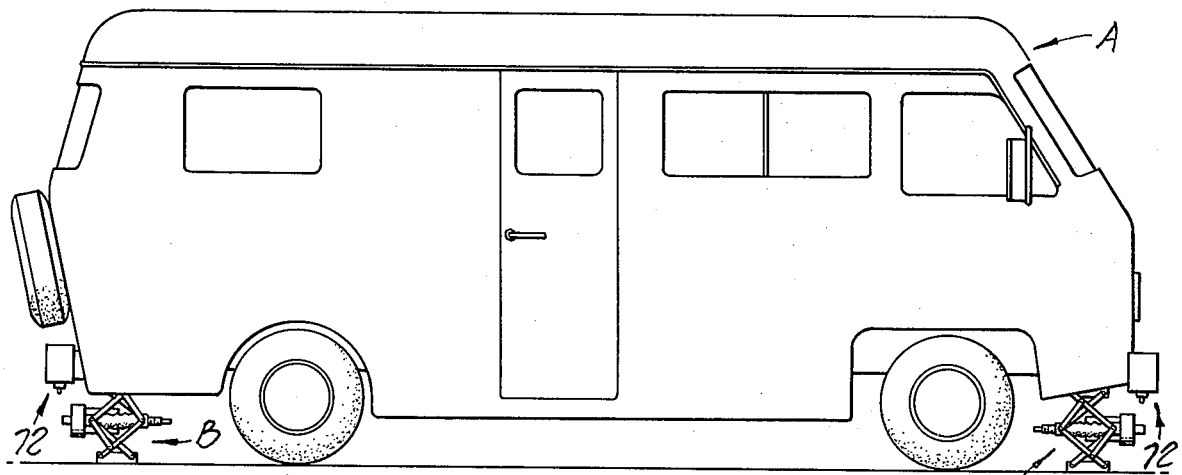
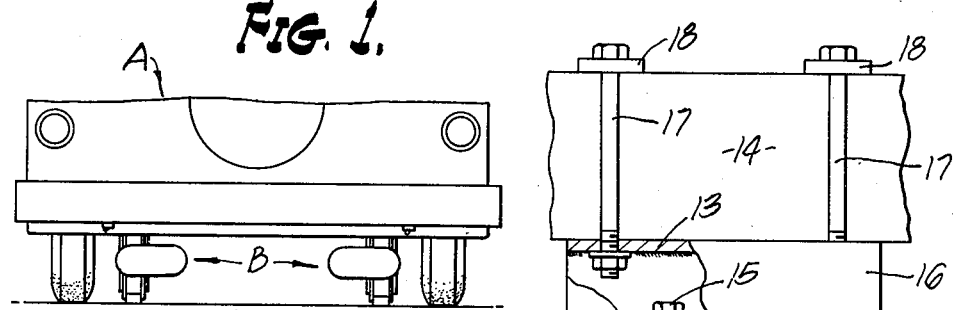
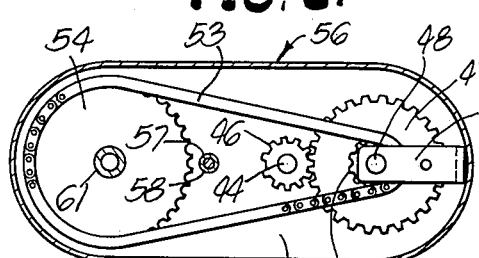
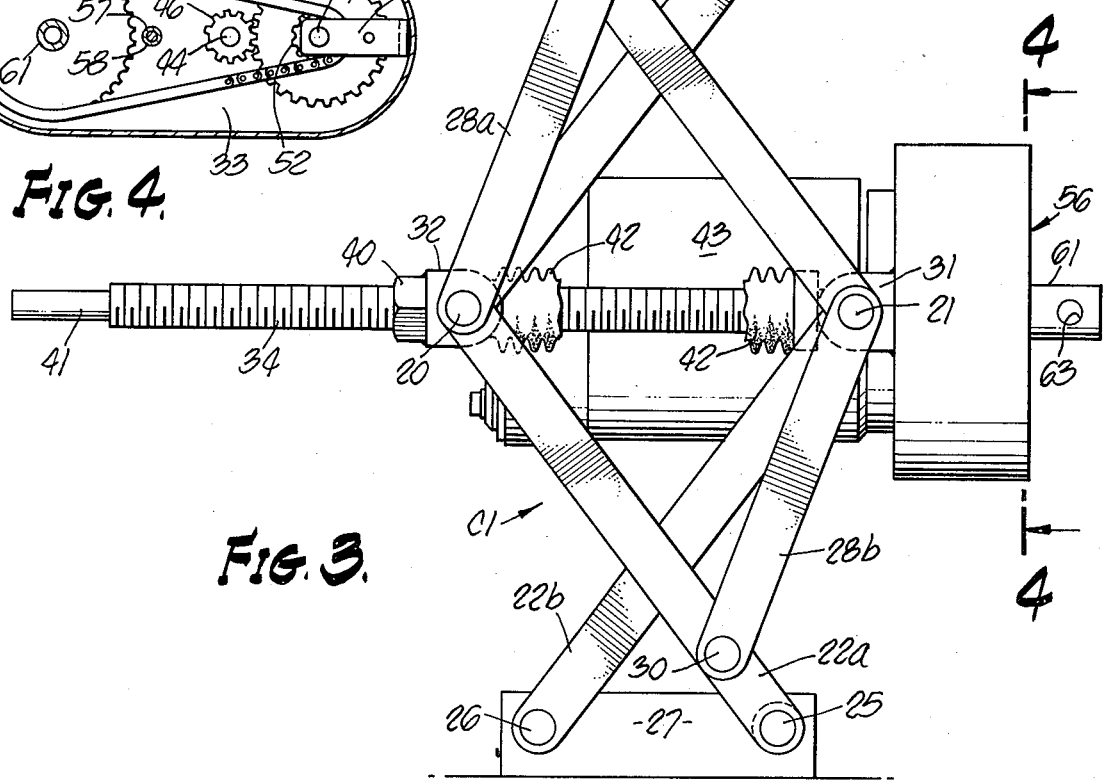

VEHICLE IN-PLACE ELECTRIC JACK

PRIOR ART

In the prior art there are numerous embodiments of in-place jacks, but these have in general been hand operated, hydraulically actuated, motor driven screw types, hydraulically actuated pivoted lever types or otherwise of a structure which makes them inherently ill-adapted for the intended purpose, or economically so expensive as to prevent their general use and acceptance. The closest art known to applicant comprises the following U.S. Pats. Nos.: 1,088,263 — Feb. 24, 1914; 1,281,275 — Oct. 15, 1918; 1,539,974 — June 2, 1975; 1,954,994 — Apr. 17, 1934; 2,204,997 — June 18, 1940.

BACKGROUND OF THE INVENTION

The present invention relates generally to the field of load lifting devices.

It has heretofore been generally known to utilize jacking devices of the screw type and pivoted lever type for the elevating, lowering and leveling of rigid loads in load bearing structures as represented by campers, trucks, motor vans and the like.

It has also been common knowledge to utilize inplace jacks permanently mounted on the vehicle chassis, and which may be manually or power operated by an electric motor or hydraulic means, as desired for leveling, changing tires and the like.

In the known jacking devices, and particularly in the power actuated devices, the embodiments are as a rule rather complicated and expensive to manufacture, and inherently are of such design to prevent their general use and acceptance. The present invention therefore has for a primary feature the improvement of the known jack types so as to overcome the disadvantages thereof, and to provide a jack assembly of relatively simple construction, which is actuated by an electric motor mounted on the pivoted levers of the jacking structure, which is economical of manufacture, and which is effective and efficient in operation, and which can be effectively controlled either at the jack or remotely from the control or driving compartment of the vehicle.

SUMMARY OF THE INVENTION

The present invention relates generally to load jacking devices, and is more particularly concerned with improvements of in-place permanently mounted jacking assemblies having electric actuating motors which are selectively controllable. With the foregoing in mind, it is one object of the herein described invention to provide an improved and simplified power actuated jack assembly of the pivoted lever type.

A further object is to provide an in-place jacking assembly according to the preceding object, in which the power actuator comprises an electric motor carried by the pivoted lever structure.

Another object is to provide a pivoted lever jack in which a motor actuated screw member is utilized to actuate the pivoted levers between extended and retracted positions, and wherein the screw member is automatically immobilized in the fully retracted position of the levers.

Still another object relates to improvements in the control for the respective jacks, wherein the jacks are selectively controllable locally at each jack or remotely from a driving or control compartment of the vehicle, and wherein the control is interlocked with the control of the engine ignition circuit so that the jacks can be actuated only when the ignition switch is in an "off" position.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a side elevational view of a vehicle equipped with in-place jacking assemblies according to the present invention;

FIG. 2 is a fragmentary end elevational view of the same, showing the lateral spacing of the jack assemblies;

FIG. 3 is an enlarged fragmentary elevational view showing the details of construction, and the manner of mounting on the frame structure of the vehicle, the pivoted levers being in extended position;

FIG. 4 is a vertical section through the transmission housing, taken substantially on line 4—4 of FIG. 3, and showing the elements of the transmission connection between the driving motor and the jack actuating screw;

DESCRIPTION OF A PREFERRED EMBODIMENT

Figure 5:
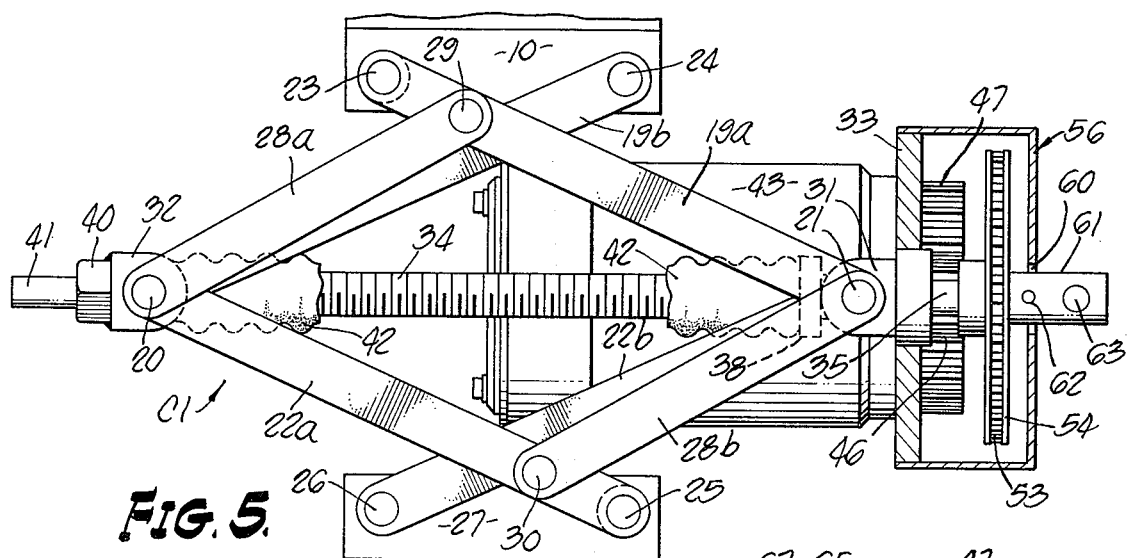
FIG. 5 is a view similar to FIG. 3, showing the pivoted levers in retracted position, and including a transverse sectional view taken through the transmission housing.

Referring more particularly to the drawings, for illustrative purposes, the invention is disclosed in FIG. 1 as being applied to the frame structure of a wheeled vehicle, in this case a motor van as generally indicated at A, each of the jacking units comprising an independently operable in-place permanently mounted jacking assembly, as generally indicated at B, one of these jacking assemblies being mounted at each side of the front end of the vehicle frame structure, and at each side of the rear end of the frame structure. The jacking assemblies are each self-contained and can be attached and detached as a complete unit. Since each of the jacking assemblies is similarly constructed, it is believed that it will only be necessary to completely describe one of the jacking assemblies in order to clearly understand its construction and operation.

Referring to FIG. 3, the jacking assembly is illustrated as comprising an upper attaching elongate member 10, which may comprise an inverted U-shaped channel structure having spaced side walls 11 and 12 extending from a bridging wall 13. Although the attaching member 10 may be secured directly to a frame member of the vehicle, as indicated by the numeral 14, it is preferred that the attaching member be secured as by suitable bolts 15 so as to depend from a tubular spacer, as indicated by the numeral 16, this spacer in turn being attached to the frame member as by a plurality of bolts 17 positioned on each side of the frame member 14 and being supported from a transversely extending strap member 18. With such a mounting, the jacking assembly may be affixed to the vehicle frame at any desired location.

Figure 6:
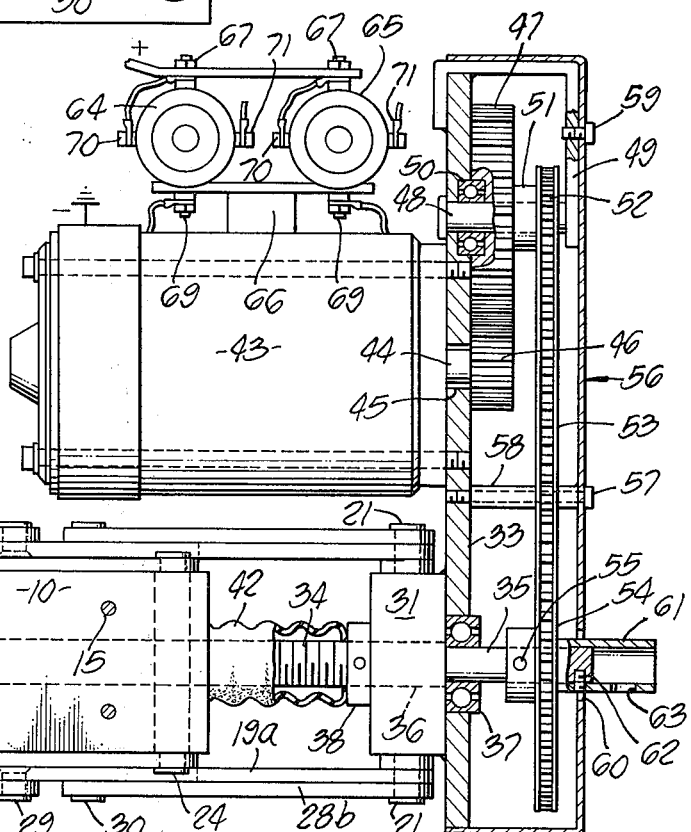
FIG. 6 is a top plan view of the jacking assembly with a horizontal section taken through the transmission housing to show the cooperative relationship of the transmission components.

The jacking mechanism for providing raising and lowering jacking movements comprises two similar sets of pivotally connected crossed-lever assemblies C1 and C2, as shown in FIG. 6, these assemblies being operatively arranged on opposite sides of the attaching member 10. Since these assemblies are similar, it is believed that it will be necessary to specifically describe only one of the assemblies. The lever assembly C1 is shown as comprising pivotally connected levers which constitute in effect a lazy-tong configuration. More specifically, a pair of upper crossed levers 19a and 19b are pivotally connected at their lowermost ends by pivots 20 and 21 to the uppermost ends of a pair of lower crossed levers 22a and 22b. The uppermost ends of the levers 19a and 19b are pivotally connected to the attaching member 10 at fixed spaced points by pivots 23 and 24, while the lowermost ends of levers 22a and 22b are connected by pivots 25 and 26 to a ground engaging member 27.

Synchronization of the movement of the levers as just described above, during extension and retraction of the jacking mechanism, is accomplished by providing a pair of interconnecting levers 28a and 28b. The lever 28a has one end pivoted on the pivot 20, while its other end is connected to the lever 19a by a pivot 29 which is spaced from the pivot 23. Similarly, the lever 28b has one end connected to the pivot 21 and its other end pivoted on the lever 22a by a pivot 30 having spaced relation with respect to pivot 25. As thus arranged, it will be observed that the levers 19a, 22a, 28a and 28b form in effect a parallelogram.

With the lever arrangement described above, it will be apparent that the jacking mechanism may be extended and retracted simply by providing means for moving the pivots 20 and 21 towards and away from each other. For such purpose, the pivot pins 21 of the lever assemblies C1 and C2 are arranged at the opposite ends of a first pivot block structure 31, while the pivots 20 are arranged at the opposite ends of a second pivot block structure 32, as shown in FIG. 6.

The pivot block structure 31 is fixedly secured as by welding to a back frame plate 33 which serves as a support for the motor driven actuating mechanism as will be hereinafter described.

For actuating the jacking mechanism, an elongate screw member 34 is operatively associated with the pivot block structures 31 and 32. As shown, the screw member has an unthreaded end extension 35 which extends through a bore 36 in the pivot block structure 31 and has its outer end rotatably supported in anti-friction bearings 37 mounted on the back frame plate 33. On the opposite side of the block structure 31, a thrust collar 38 is secured to the screw member, this thrust collar bearing against an adjacent face of the pivot block structure 31.

At its opposite end, the screw member 34 extends through a bore 39 of the block structure 32 and is adapted to make threaded engagement with the internal threads of a nut 40 which is fixedly secured as by welding to an outer face of the block structure 32. This end of the screw member is provided with a non-threaded extension end portion 41 so that, when the jacking mechanism reaches a fully retracted position, the threads of the screw 34 will be disengaged with respect to the nut 40, and thus terminate the retracting movement of the jack. However, when the rotation of the screw is reversed in order to extend the jacking mechanism, the threads of the screw will again engage the threads of the nut 40 and operate to move the pivot block structure 32 towards the pivot block structure 31. In order to protect the threaded portion of the screw 34 from dust, which might interfer with its proper operation, a protective sleeve 42 is provided around the screw member, this sleeve extending between the block structures 31 and 32, and being made from a suitable material to permit expansion and contraction of the sleeve during movements of the jack to extended and retracted positions.

As will be best seen in FIG. 6, the back frame plate 33 is laterally extended to one side of the jacking mechanism and serves as a mounting support for an electric motor 43 which is secured to the back plate by appropriate means so as to extend from the back plate on the same side as the jacking mechanism. The motor 43 has a drive shaft 44 which extends through an opening 45 in the back plate and is fitted with a driving pinion 46 having meshed connection with the teeth of an idler gear 47 which is rotatably mounted upon a stub shaft 48 having one end supported in the back plate 33, and its outer end supported in a bracket 49 affixed to the back plate. The gear 47 may be supported, if desired, on anti-friction bearings as indicated at 50. The gear 47 has an axial extending hub 51 on one side to which a driving sprocket 52 is affixed by appropriate means. The driving sprocket 52 is connected by means of a drive chain 53 with a larger driven sprocket 54 which has its hub portion secured as by a set screw 55 to the end extension 35 of the screw member 34. With this arrangement, it will be apparent that the idler gear 47, the drive sprocket 52, and the driven sprocket 54 serve as a speed reducing connection between the motor shaft 44, and the actuating screw member 34.

The gearing, sprockets and drive chain are normally concealed and protected by a removable cover 56 which is removably secured in position by means of a bolt 57 which is adapted to extend through a tubular spacer 58 having its outer end secured as by welding to the outer wall of the cover, and its other end being adapted to abut the back plate 53, the bolt being threadedly engageable at its inner end with a threaded opening in the back plate 33. Another retaining screw 59 is adapted to threadedly engage with the underlying bracket 49. In axial alignment with the drive end of the screw member 34, the cover is provided with an opening 60 through which an extension sleeve 61 extends, this sleeve being secured to the adjacent end of the screw member as by a set screw 62. The projecting end of this sleeve is provided with a peripheral opening 63 which is adapted to receive a hooked end of a crank (not shown) for manually operating the screw in the event that the motor 43 for some reason in inoperative.

As shown in FIG. 6, the direction of rotation of the motor 43 is selectively controlled by means of solenoid actuated relays 64 and 65 which are mounted upon an insulating bracket 66 secured to the motor housing. These relays have high current capacity terminals 67 which are adapted to be connected to the positive side of the automobile storage battery 68 which has its negative side connected to ground. High current output terminals 69 of these relays are respectively connected to the motor windings for operating the motor in a forward or reverse direction, depending upon which relay is closed. The operating solenoids of the relays have one set of control terminals 70 which are connected to the positive side of the battery, while the other solenoid terminals 71 are selectively connectible through control switches to the grounded side of the battery. The motor windings have a common ground connection with the motor housing which is in this case grounded.

Figure 7:
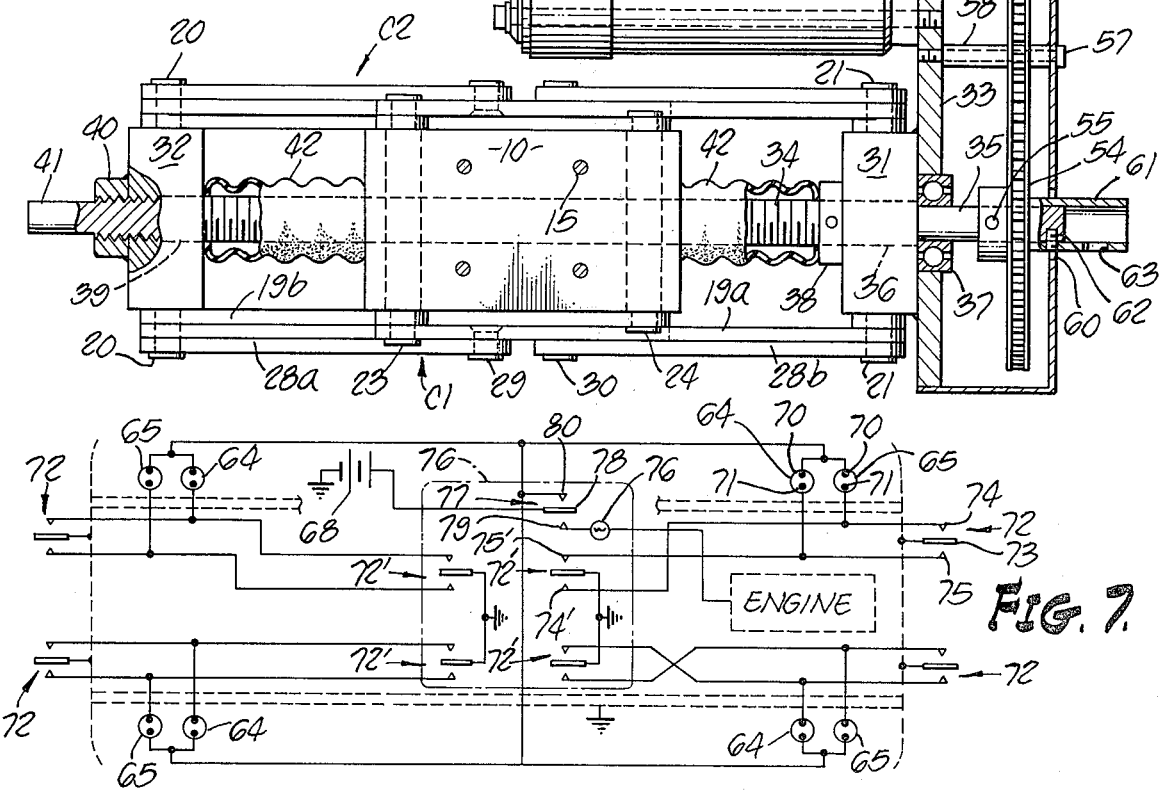
FIG. 7 is a view diagrammatically illustrating the control circuitry for the jack assemblies.

As shown in FIG. 7, provision is made for locally controlling the operation of each jack by means of a local control switch, as generally indicated at 72, which may be mounted on the adjacent bumper or other suitable grounded portion of the vehicle frame. Each of these switches is of the single-pole double-throw type and comprises a movable grounded contact 73 which is selectively movable into engagement with one or the other of the switch contacts 74 or 75 which are connected through conductors respectively with the contacts 71 of the solenoid actuated relays. Through the operation of the switch 72, the associated jacking mechanism may thus be extended or retracted, when desired.

Provision is also made for remotely operating each jacking mechanism by means of similar control switches 72' positioned in an operating or driving compartment of the vehicle as indicated at 76 in phantom lines. Each of the switches 72' has contacts 74' and 75' which are in parallel connection with the contacts 74 and 75 of the switches 72.

As a safety feature, provision is made to prevent the operation of the jacking mechanisms by means of the switches 72 or 72', unless the engine ignition circuit, as controlled by the ignition switch 76, has been interrupted. For this purpose, there is provided an override switch 77 of the single-pole double-throw type in which a movable contact 78 connected with the positive side of the battery is selectively movable into engagement with a contact 79 for closing the circuit through the ignition switch 76, or into engagement with a contact which connects the positive side of the battery to the positive control terminals 70 of all of the solenoid control relays 64 and 65. Thus, it is necessary for the operator to disconnect the battery with reference to the contact 79 of the ignition circuit before the positive side of the battery can be connected to the positive terminals of the solenoid control relays.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. Vehicle in-place jacking means for mounting on the frame structure of the vehicle, comprising:
   a. a jacking mechanism having pivotally connected sets of levers constituting a lazy-tong configuration extending between an upper attaching member and a lower ground engaging member, one set of said levers having adjacent ends pivoted on a first pivot block structure, and another set of said levers having adjacent ends pivoted on a second pivot block structure;
   b. an actuating screw member operable to selectively extend and retract the levers to and from a jacking position, said screw member having one end rotatable in said first block structure, but retained against axial movement therein, and being provided with screw threads for threaded engagement with said second block structure, said screw threads being terminated short of the other end of said screw member, whereby threaded movement of the second block structure will be terminated upon movement of the levers to a predetermined retracted position;
   c. a laterally extending back frame plate rigidly secured to and supported from said first pivot block;
   d. a bearing on said plate for rotatably supporting said one end of the screw member;
   e. a driving motor wholly supported on said back plate so as to extend therefrom on the same side as the levers of said jacking mechanisms, said motor having a driving shaft extending through said back plate in parallel relation to said screw member; and
   f. a driving connection between said motor shaft and said screw member positioned on the opposite side of said back plate from the jacking levers and motor.

2. Vehicle jacking means according to claim 1, wherein a flexible extendable-contractable protective sleeve surrounds the portion of said screw member extending between said blocks.

3. Vehicle jacking means according to claim 1, in which said driving connection includes a driving sprocket driven by said motor, a driven sprocket carried by said screw member, and a flexible transmission member trained over said sprockets.

4. Vehicle jacking means according to claim 3, in which said screw member has an end extension adapted to releasably receive a manually operable crank for emergency operation of the jacking mechanism.

5. Vehicle jacking means according to claim 1, in which one of said jacking mechanisms is mounted at each side of the front end of the frame structure, and at each side of the rear end of the frame structure; an electrical source; and switching means for selectively connecting the motors of said jacking mechanisms to said source, and for selectively operating said mechanisms in raising and lowering directions as required to level said vehicle.

6. Vehicle jacking means according to claim 5, in which said electrical source comprises a battery; and said switching means comprises a normally open manually controlled switch at each jacking mechanism in an energizing circuit from said source to the motor of the jacking mechanism, said switch being selectively operable to one position for energizing the motor for rotation in a direction to extend the jacking mechanism, and to another position to energize the motor for rotation in a reverse direction to retract the jacking mechanism.

7. Vehicle jacking means according to claim 6, in which said switching means includes a second switch located in a control compartment of the vehicle corresponding to the control switch at each jacking mechanism, said switches being connected in parallel, whereby the motor of each jacking mechanism may be selectively controlled remotely from the control compartment of the vehicle and locally at the jacking mechanism.

* * * * *